(12) United States Patent
Taylor

(10) Patent No.: US 9,919,554 B2
(45) Date of Patent: Mar. 20, 2018

(54) HYBRID WHEEL

(71) Applicant: Fredrick Taylor, Rome, GA (US)

(72) Inventor: Fredrick Taylor, Rome, GA (US)

( * ) Notice: Subject to any disclaimer, the term of this patent is extended or adjusted under 35 U.S.C. 154(b) by 13 days.

(21) Appl. No.: 15/066,325

(22) Filed: Mar. 10, 2016

(65) Prior Publication Data

US 2017/0259615 A1 Sep. 14, 2017

(51) Int. Cl.
*B60B 3/00* (2006.01)
*B60B 3/16* (2006.01)
*B60B 3/08* (2006.01)

(52) U.S. Cl.
CPC ............... *B60B 3/001* (2013.01); *B60B 3/16* (2013.01); *B60B 3/082* (2013.01); *B60B 2310/305* (2013.01); *B60B 2310/311* (2013.01); *B60B 2310/318* (2013.01); *B60B 2360/102* (2013.01); *B60B 2360/104* (2013.01); *B60B 2360/106* (2013.01); *B60B 2360/36* (2013.01); *B60B 2900/111* (2013.01)

(58) Field of Classification Search
CPC ..... B60B 3/001; B60B 3/16; B60B 2360/102; B60B 2360/104; B60B 2360/106; B60B 2360/36; B60B 2310/305; B60B 2310/311; B60B 2360/318; B60B 2900/111; B60B 3/082

USPC ........... 301/64.701, 64.702, 64.703, 64.704, 301/64.705, 64.706
See application file for complete search history.

(56) References Cited

U.S. PATENT DOCUMENTS

| | | | | |
|---|---|---|---|---|
| 5,031,965 A | * | 7/1991 | Buerger | B60B 7/04 301/108.4 |
| 5,171,074 A | * | 12/1992 | Seksaria | B60B 3/042 301/64.304 |
| 5,651,590 A | * | 7/1997 | Word | B60B 3/02 29/894.322 |
| 5,899,538 A | * | 5/1999 | Tatraux-Paro | B60B 5/00 301/63.101 |
| 6,419,327 B1 | * | 7/2002 | Renshaw | B60B 7/04 301/37.102 |
| 2004/0036348 A1 | * | 2/2004 | Schroeder | B60B 1/06 301/64.702 |

* cited by examiner

*Primary Examiner* — S. Joseph Morano
*Assistant Examiner* — Jean W Charleston
(74) *Attorney, Agent, or Firm* — Thomas | Horstemeyer, LLP

(57) ABSTRACT

A hybrid wheel including a functional rim, a center disc, and a wheel face insert, wherein the wheel rim and the center disc are made of a specified material, and wherein the wheel face insert is made of a dissimilar material. The wheel face insert can be secured to the center disc by at least one of screws, pins, rivets, or structural adhesive, and/or the wheel face insert can be secured to the functional rim by at least one of screws, pins, rivets, or structural adhesive.

18 Claims, 11 Drawing Sheets

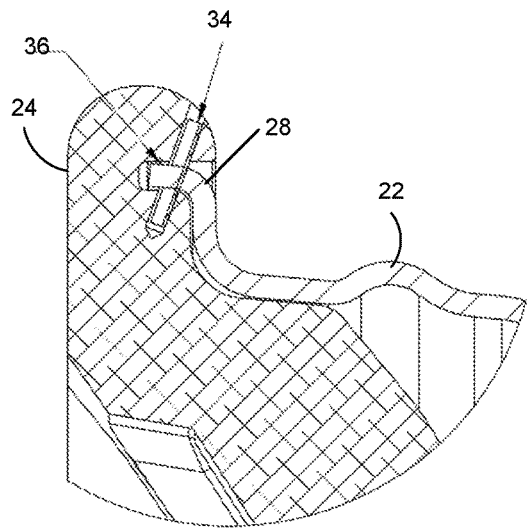
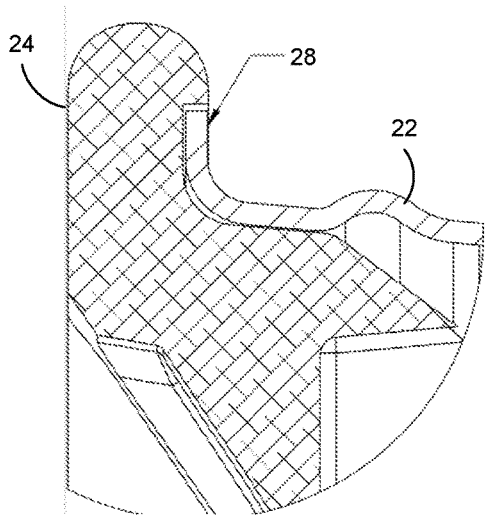
FIG. 5     FIG. 6a
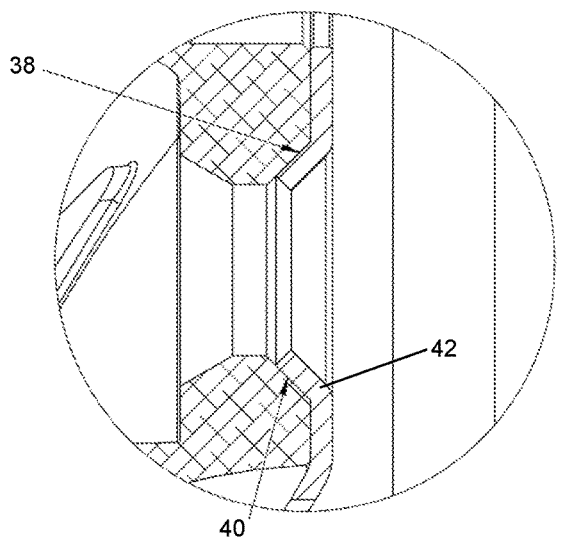
FIG. 6b

9,919,554 B2

HYBRID WHEEL

TECHNICAL FIELD

This disclosure relates to hybrid wheels for vehicles. More specifically, this disclosure concerns, wheel assemblies for the off road power sports product market, trailers and light trucks.

BACKGROUND

Off road power sport vehicles, trailers, and light trucks are utilized for both work and recreation purposes. Consumers purchasing all-terrain vehicles (ATV), utility terrain vehicles (UTV), rugged terrain vehicles (RTV), side-by-side vehicles, trailers, or light trucks often consider not only function and performance, but also style of a vehicle and accessories.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 5 shows a detailed example of a wheel face insert flange at rim fitment, according to various embodiments of present disclosure.

FIGS. 6a and 6b is another detailed views of a wheel face insert flange at rim fitment. FIG. 6b is a detailed view of an anti-rotational feature, such as a chamfer or extrusion, to constrain against rotation at a center disc and a wheel face insert via backside of bolt holes, according to various embodiments of present disclosure.

DETAILED DESCRIPTION

Figure 1A:
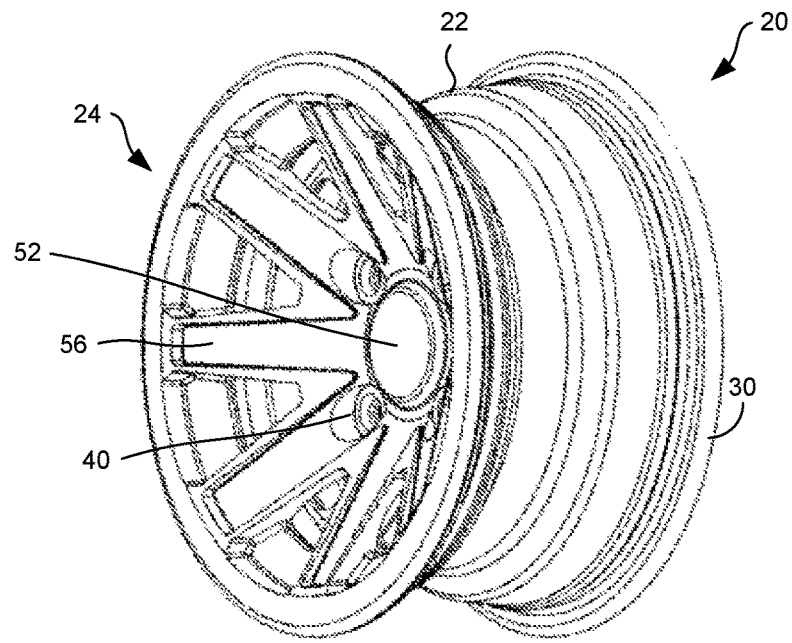
FIGS. 1a and 1b are illustrations of an assembled hybrid wheel according to various embodiments of present disclosure.

Described below are various embodiments of the present systems and methods for wheel assembly. Although particular embodiments are described, those embodiments are mere exemplary implementations of the system and method. One skilled in the art will recognize other embodiments are possible. All such embodiments are intended to fall within the scope of this disclosure. Moreover, all references cited herein are intended to be and are hereby incorporated by reference into this disclosure as if fully set forth herein. While the disclosure will now be described in reference to the above drawings, there is no intent to limit it to the embodiment or embodiments disclosed herein. On the contrary, the intent is to cover all alternatives, modifications and equivalents included within the spirit and scope of the disclosure.

The present disclosure relates to rim and wheel assemblies for the off road power sport product market, trailers, and light trucks. Power sport products include all-terrain vehicles (ATV), utility terrain vehicles (UTV), rugged terrain vehicles (RTV), and side-by-side vehicles. For example, off road vehicles can be utilized for ranching or farming tasks, towing heavy loads, hauling cargo or tools to remote locations, hunting, or other sporting activities. Wheels designed for these vehicles must be able to endure the rough conditions that most users will be operating the vehicles. Likewise, trailers and light trucks may be used for similar tasks. These vehicles may have various tire pressures, use a tire liner, be foam filled, or other configuration. Consumers often consider not only function and performance, but also style of the vehicle and accessories. Customization of the vehicles is desired with some owners seeking more visually appealing wheels.

Aluminum alloy wheels are often used on vehicles such as automobiles and light weight trucks to provide a clean upscale appearance. Owners of off road power sport vehicles or utility vehicles, such as light trucks or trailers, are seeking a similar appearance, but using aluminum alloy wheels for an off road application can be impractical. A wheel that provides the strength and durability of steel and appearance of an aluminum, magnesium, alloy, carbon fiber, polyamide, or other composite wheel is desirable.

In various aspects, a hybrid wheel is provided to address such interests. The hybrid wheel can include a functional rim, a center disc, and a decorative wheel face insert. The functional wheel rim can be made from steel, high strength steel, a composite material or an alloy. In various aspects the functional wheel rim is made of a high strength material, with yield strength of about 35 ksi-about 86 ksi, and any range in between. A non-limiting example of a high strength material is high strength steel. The center disc can be made from steel, high strength steel, a low strength mild steel, a composite material, or an alloy. In various aspects, the center disc is made of a high strength material. In various aspects, the center disc is made of the same material as the material for the functional wheel rim with a yield strength of about 35 ksi-about 86 ksi. The wheel face insert can be made of aluminum, aluminum alloy, magnesium, polyamide, composite, carbon fiber, plastic, or some other material that can be used to provide a decorative insert such as providing the appearance of aluminum and/or an aluminum wheel on the first surface. In various aspects, the wheel face insert is made of a material that is different than the material for the functional wheel rim. In various aspects, the wheel face insert is made of a material having a lower strength than the material of the functional wheel rim. In some aspects, wheel face insert can be one piece. In other aspects, to accommodate deeper wheel offsets, the wheel face insert can include a rim flange cap ring and at least a wheel center face insert.

Figure 1B:
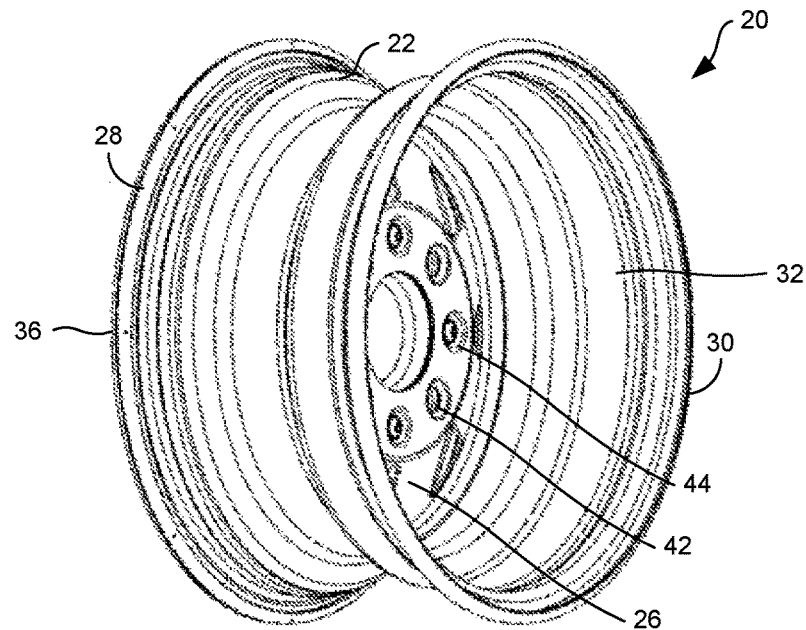

Referring now in more detail to the drawings, in which numerals indicate like parts through the several views, FIGS. 1a and 1b illustrate front and rear perspective views as an example of an assembled hybrid wheel 20 for power sport vehicles of the present disclosure. According to various embodiments, the hybrid wheel 20 includes a functional rim 22, a wheel face insert 24, and a center disc 26. The functional rim 22 is substantially cylindrical with varying diameter, having a first annular edge or bead rim 28 at the front and a second, opposed annular edge or bead rim 30 at the rear. The wheel face insert 24 can be attached to the center disc 26 and/or to the first annular edge 28 of the functional rim 22. According to various embodiments, the wheel face insert 24 can be secured to the functional rim 22 and/or to the center disc 26 by using pins, screws, rivets, welds, and/or structural adhesive. By a structural adhesive is meant typically epoxy, urethane or acrylic materials with a lap shear strength of greater than 2 MPa, preferably 10 MPa. Suitable structural adhesives include Dow BETAMATE™, Ashland Chemical Pliogrip™, 3M Scotch-Weld™, LORD Maxlok™, and similar products.

Figure 2A:
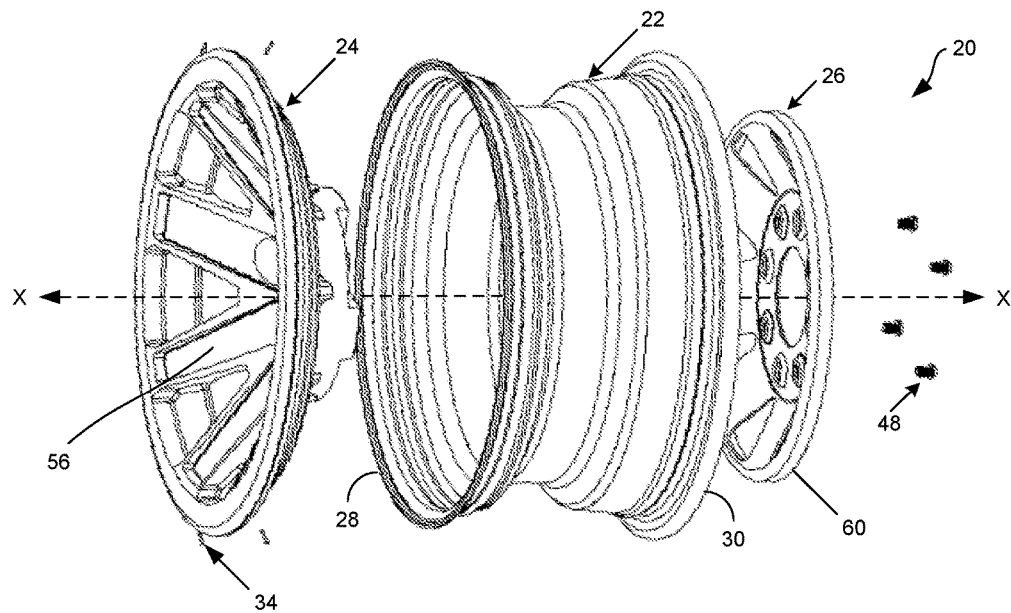
FIGS. 2a and 2b are exploded views of a wheel face insert, rim and center disc, according to various embodiments of present disclosure.
Figure 2B:
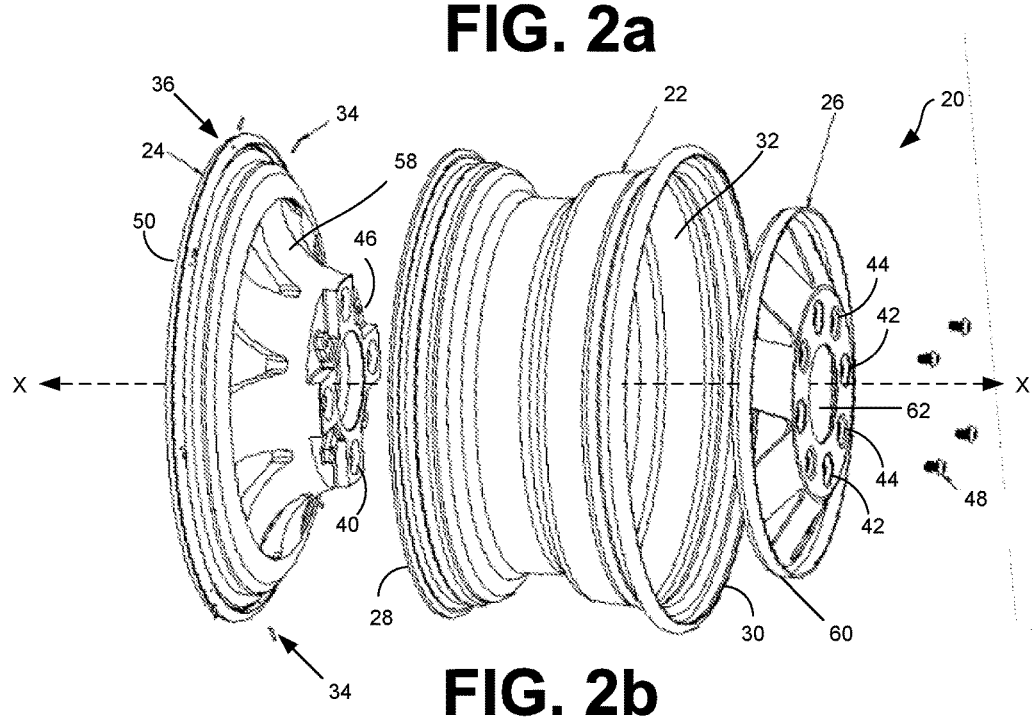
Figure 3:
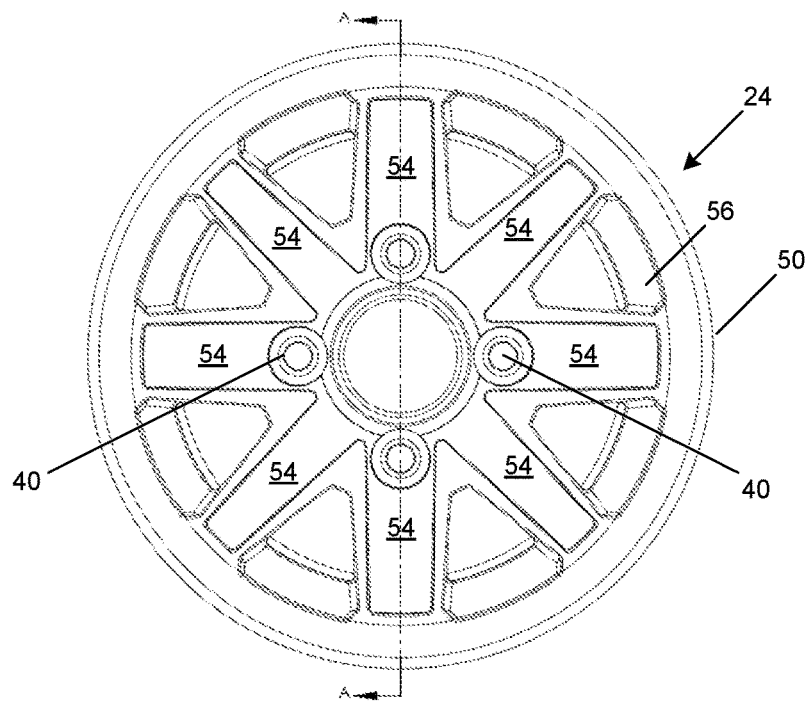
FIG. 3 is a side elevation of a hybrid wheel including a wheel face insert, indicating line A-A, according to various embodiments of present disclosure.
Figure 4:
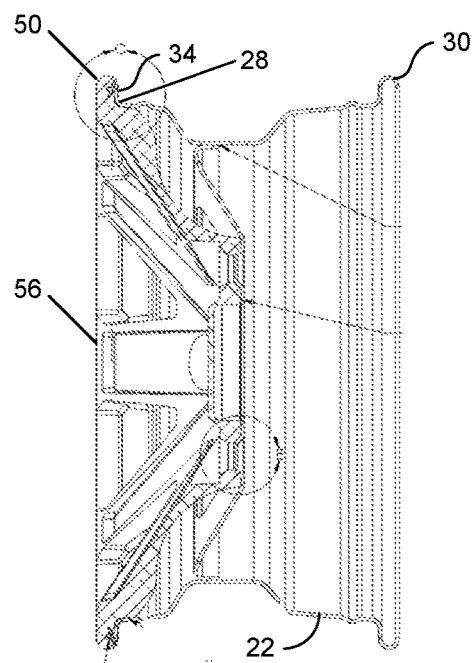
FIG. 4 is a partial longitudinal sectional view taken along line A-A according to various embodiments of present disclosure.
Figure 7:
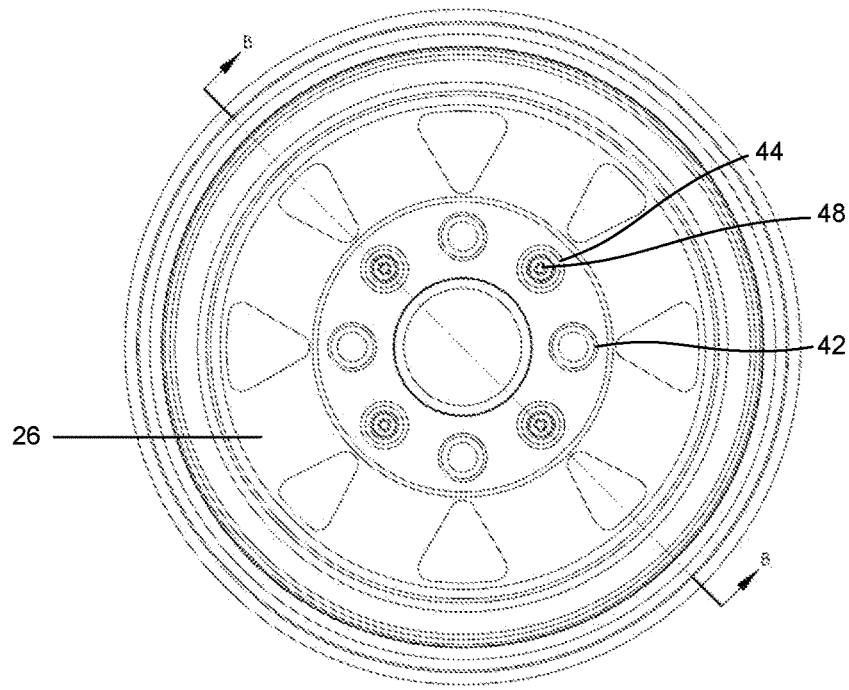
FIG. 7 is a side elevation of a hybrid wheel, including a rim and center disc, indicating line B-B, according to various embodiments of present disclosure.
Figure 8:
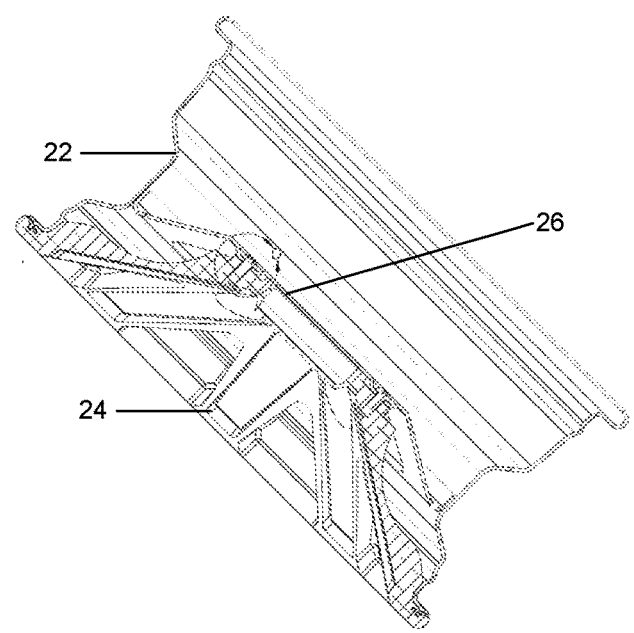
FIG. 8 is a partial longitudinal sectional view taken along line B-B, according to various embodiments of present disclosure.
Figure 9:
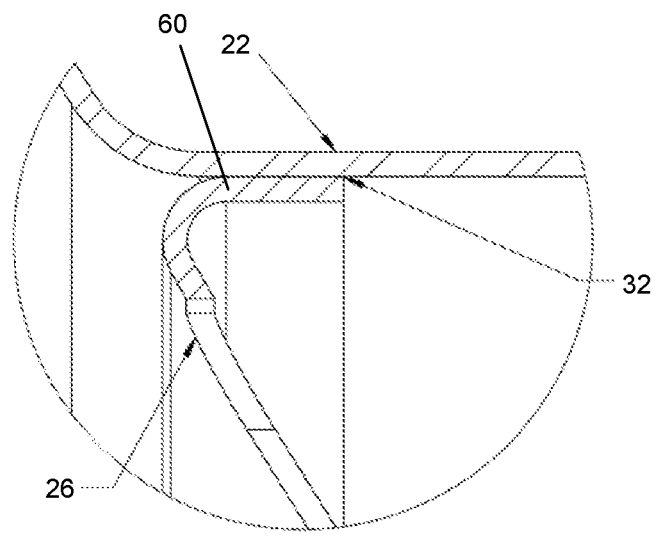
FIG. 9 is a detailed view of a center disc meeting the inner surface of a rim, according to various embodiments of present disclosure.

FIGS. 2a and 2b illustrate an example of a hybrid wheel in partially exploded views depicting a functional rim 22, a wheel face insert 24, and a center disc 26, each having a front and rear side according to various embodiments. A center axis X-X is denoted for reference. According to various embodiments, assembly of the hybrid wheel can be secured by using pins, screws, rivets, welds, and/or structural adhesive.

The functional rim 22 is substantially cylindrical having a first annular edge or bead rim 28 at the front and a second, opposed annular edge or bead rim 30 at the rear with a specified depth measured along the center axis. In some aspects, the functional rim 22 has a plurality of annular sections that vary in width at specified radii from the center axis X-X. In various embodiments, the functional rim 22 can be made from steel, composite, or other material of similar strength properties. In one embodiment, the functional rim 22 is preferably made from high strength low alloy steel with a 45 ksi min yield in 2 mm or thinner. The high strength low alloy steel can range from 35-86 ksi, preferably 35-55 ksi min yield. In another embodiment, the functional rim 22 is made from super high strength steel with 80 ksi min yield. The material thickness for a functional rim 22 can range from 1 mm to 6 mm, 1 mm to 5 mm, 1 mm to 4 mm, 1 mm to 3 mm, or 2 mm or thinner.

The wheel face insert 24 has an annular rim 50 and a center hub 52. The wheel face insert 24 can include a decorative pattern. For example wheel face insert 24 can include a plurality of spokes 54 extending radially from the center hub 52 outwardly to the annular rim 50. One skilled in the art will recognize that the decorative pattern can take the form of any number of decorative patterns. For example while the wheel face insert 24 depicted in the figures includes 8 spokes, the actual number of spokes can be more or less than eight. Additionally, while the figures illustrate the single spokes, each spoke may be replaced or substituted by two or more spokes such that, for example, each spoke may be an associated pair or triplet of spokes. Other patterns include, but are not limited to, geometric patterns and solid discs with patterns embossed; cut-out, or extruded, including logos and special shapes.

The wheel face insert 24 can have a first surface 56 and second surface 58, designed to rotate about a center axis X-X. The first surface 56 can be considered the front surface and the second surface 58 can be considered the rear surface. A plurality of bolt apertures 40 can be located around the center hub 52. In various aspects, apertures 40 can be radially disposed about axis X-X, preferably though not necessarily all being equally radially disposed. In some aspects, the bolt apertures 40 can be evenly spaced. In some embodiments, the rear side or second surface 58 of the wheel face insert 24 can have a greater thickness and is sectioned at each bolt aperture 40. In some aspects, each rear side bolt aperture 40 can have a beveled edge. Optionally, interspersed between the rear side bolt apertures 40 are screw seats 46. In some aspects, the optional screw seats 46 may alternate with the bolt apertures 40. The annular rim 50 can have a flange, which can optionally contain pin seats 36 spaced about the periphery of annular rim 50 on the rear side thereof. The wheel face insert 24 can be made of aluminum, aluminum alloy, magnesium, composite, carbon fiber, plastic, or some other material, for example a material with the appearance of aluminum on the first surface.

The center disc 26 can have an annular lip 60 with a center aperture 62. Radially disposed around the center aperture 62 can be a plurality of bolt apertures 42 designed to locate and secure in position against bolt apertures 40 in wheel face insert 24. In one or more aspects the bolt apertures 42 can be chamfered 38. In some embodiments, screw apertures 44 are interposed with the center disc bolt apertures 42. In some embodiments, the center disc bolt apertures 42 and screw apertures 44 alternate. The center disc 26 can be made from steel, composite, or other material of similar strength properties. In an embodiment, the center disc 26 is preferably made from high strength low alloy steel with a 45 ksi min yield in 2 mm or thinner. The high strength low alloy steel can range from 35-86 ksi, preferably 35-55 ksi min yield. In another embodiment, the [functional rim 22] center disc 26 is made from super high strength steel with 80 ksi min yield. The material thickness for the center disc 26 can range from 1 mm to 6 mm and any range in between. In various embodiments, the functional rim 22 and the center disc 26 are made from the same material, such as a high strength steel. In other embodiments, the center disc 26 is made of a different material than the functional rim 22.

Figure 10:
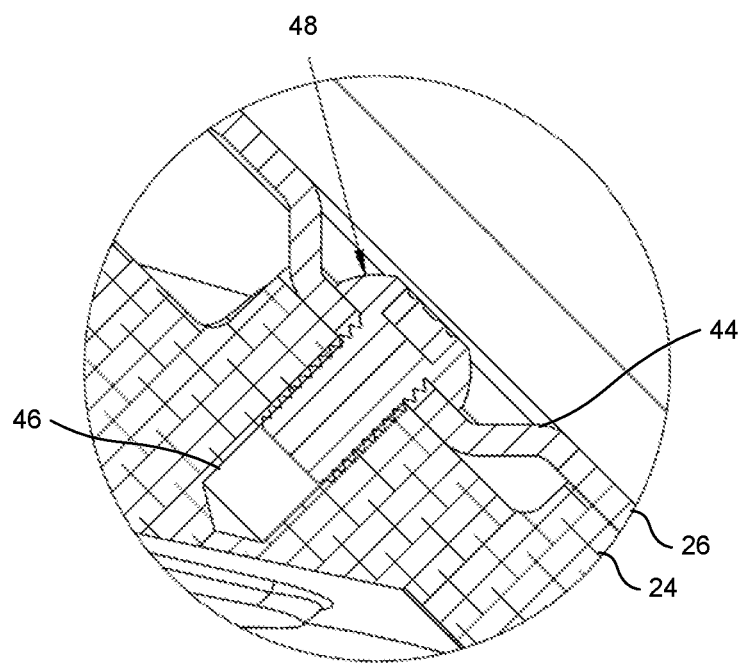
FIG. 10 is a detailed view of an optional screw to secure a center disc to a wheel face insert according to various embodiments of present disclosure.

Turning to FIGS. 3-6, according to various embodiments, the wheel face insert 24 is attached or secured to the center disc 26 and/or the functional rim 22. The wheel face insert 24 can be attached or secured to the functional rim 22 at the first annular edge 28 of the functional rim 22. According to an embodiment, the wheel face insert 24 is partially secured to the functional rim 22 by a plurality of pins 34 through the wheel face pin seats 36 about the periphery, as shown for example in FIG. 5*a*. According to other embodiments, the wheel face insert 24 is secured by structural adhesive to the functional rim 22 or to the center disc 26 or both, as illustrated for example in FIGS. 6*a* and 6*b*. According to various embodiments, the wheel face insert 24 is locked or secured to the center disc 26 at their respective screw or bolt apertures 40, 42 (see, for example, FIG. 10). In some embodiments, a chamfered connection 38 facilitates the alignment of the bolt apertures as illustrated for example in FIG. 6*b*. In some embodiments, the chamfer or extrusion constrains the wheel face insert 24 or wheel center face insert against rotation.

Continuing with FIGS. 7-10, according to various embodiments, the center disc 26 is pressed into the inner surface 32 of the functional rim 22 at a given set back depth. In some embodiments, the center disc 26 is seated on or against a shoulder. In various embodiments, the center disc 26 is secured to the functional rim 22. In some embodiments, the center disc 26 is welded to the functional rim 22. In some embodiments, a structural adhesive (such as described above) is utilized to securely attach the center disc 26 to the functional rim 22, for example about the center disc annular lip 60. In some aspects, the structural adhesive can be in liquid form, a membrane, or transfer tape.

Assembly of the hybrid wheel 20 can be secured by using pins, screws, rivets, welds, and/or structural adhesive. In a non-limiting example, a plurality of screws 48*a-d* can be inserted through a plurality of center disc screw apertures 44*a-d*, and received in the plurality of wheel face screw seats 46*a-d*. In this example, the screws 48 can be made from steel, metal, or composite. In other embodiments, the wheel face insert 24 can be attached to the center disc 26 by means of structural adhesive, such as a liquid structural adhesive, a membrane, or transfer tape. Additionally, the wheel face insert 24 can be secured to the center disc 26 by locking a plurality of wheel face bolt apertures 40 to a plurality of center disc bolt apertures 42. Optionally, the wheel face insert 24 can be secured to the functional rim 22 by a plurality of pins 34 in multiple places around the periphery of the wheel face insert 24 marked by predetermined pin seats 36.

According to some embodiments, a deeper wheel offset is required for some vehicles. In various embodiments, the wheel face insert 24 can be replaced with at least a rim flange insert cap ring 64 and a wheel center face insert 66.

Figure 11A:
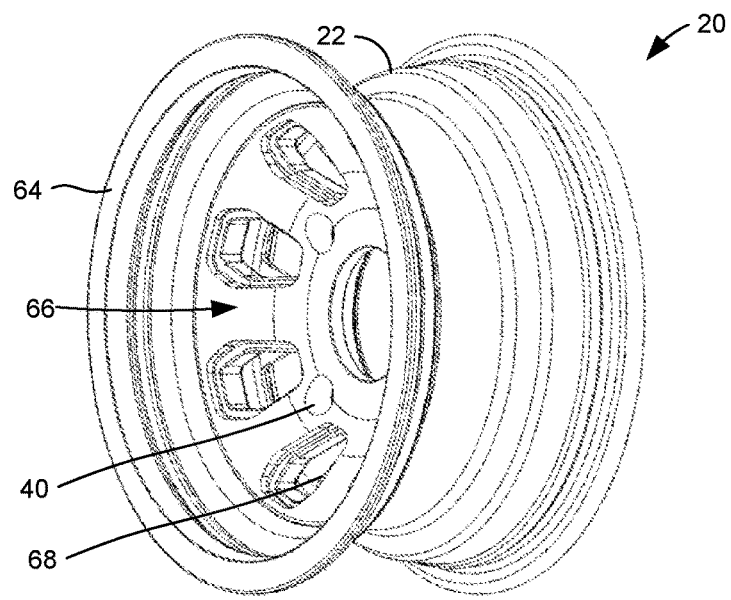
FIGS. 11a and 11b are illustrations of an assembled hybrid wheel with two piece wheel face insert according to various embodiments of present disclosure.
Figure 11B:
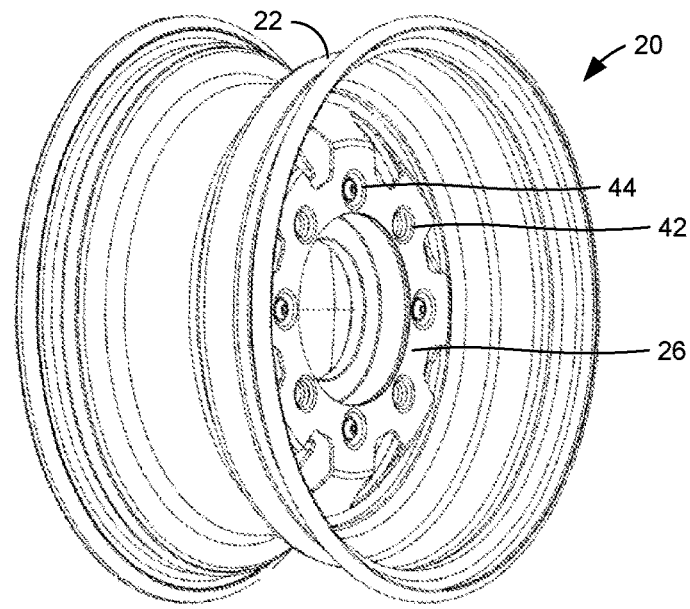

FIGS. 11*a* and 11*b* illustrate front and rear perspective views as an example of an assembled hybrid wheel 20 of the present disclosure including a rim flange insert cap ring 64, a wheel center face insert 66, a functional rim 22, and a center disc 26. The wheel center face insert 66 can be secured to the functional rim 22 at the inner surface 32 and/or to the center disc 26 by using pins, screws, rivets, welds, and/or structural adhesive. In some embodiments, structural adhesive is used around the circumference of the wheel center face insert 66 to secure to the functional rim 22. By a structural adhesive is meant typically epoxy, urethane or acrylic materials with a lap shear strength of greater than 2 MPa. Suitable structural adhesives include Dow BETA-MATE™, Ashland Chemical Pliogrip™, 3M Scotch-Weld™, LORD Maxlok™, and similar products.

Figure 12A:
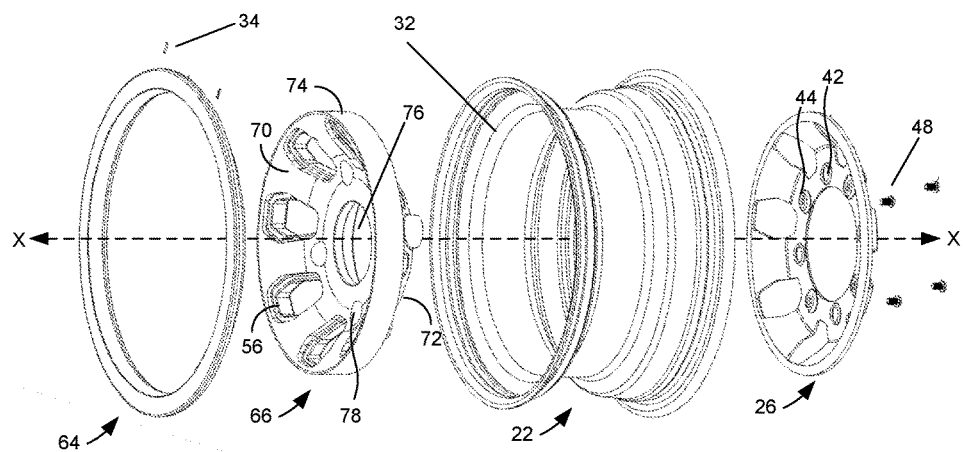
FIGS. 12a and 12b are exploded views of a rim flange insert cap ring, wheel center face insert, rim, and center disc, according to various embodiments of present disclosure.
Figure 12B:
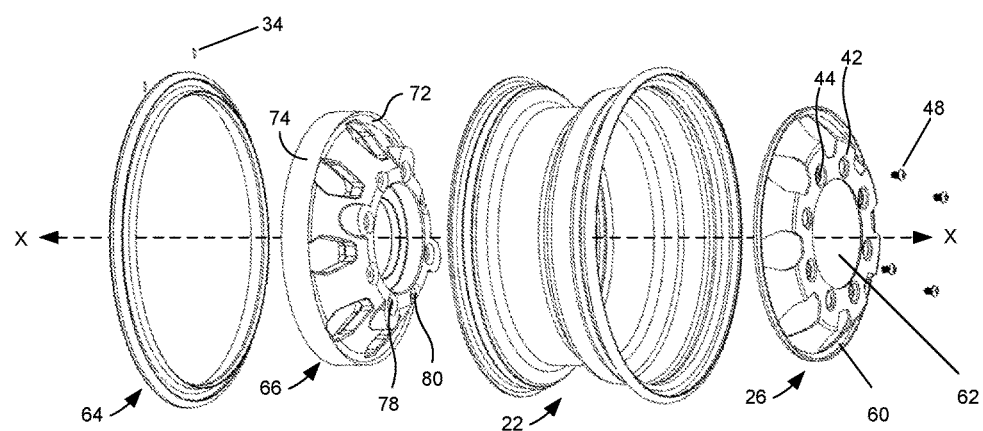
Figure 13:
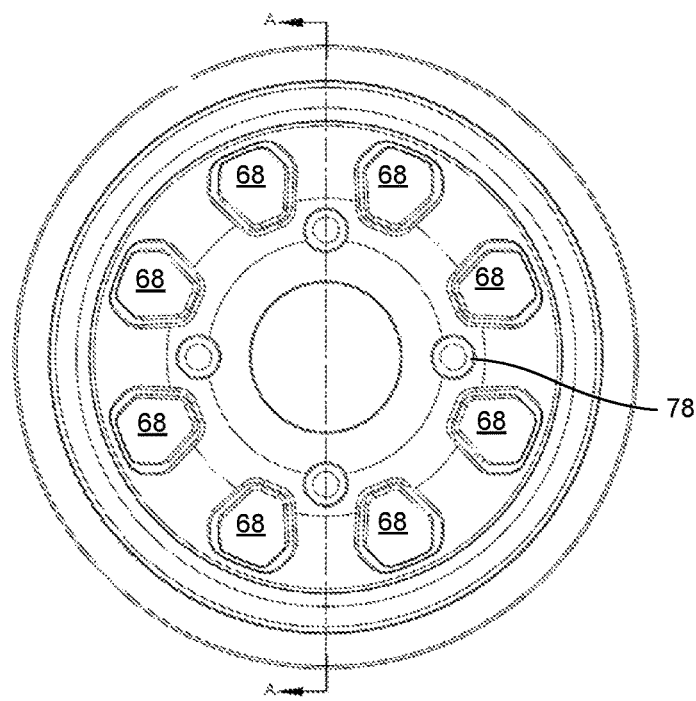
FIG. 13 is a side elevation of a hybrid wheel including a rim flange insert cap ring, wheel center face insert, rim, and center disc, indicating line A-A, according to various embodiments of present disclosure.
Figure 14:
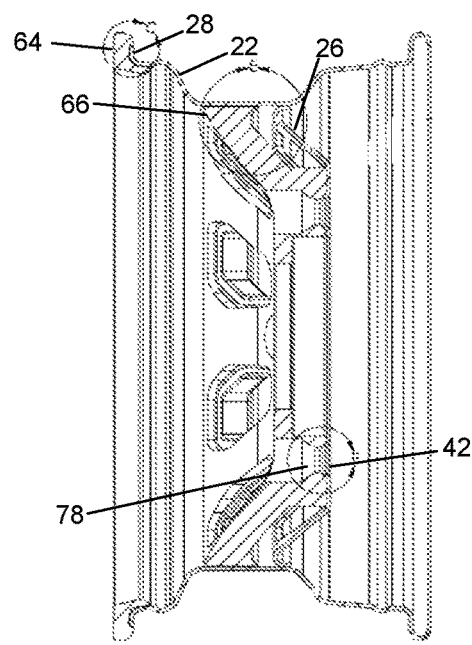
FIG. 14 is a partial longitudinal sectional view taken along line A-A according to various embodiments of present disclosure.
Figure 15:
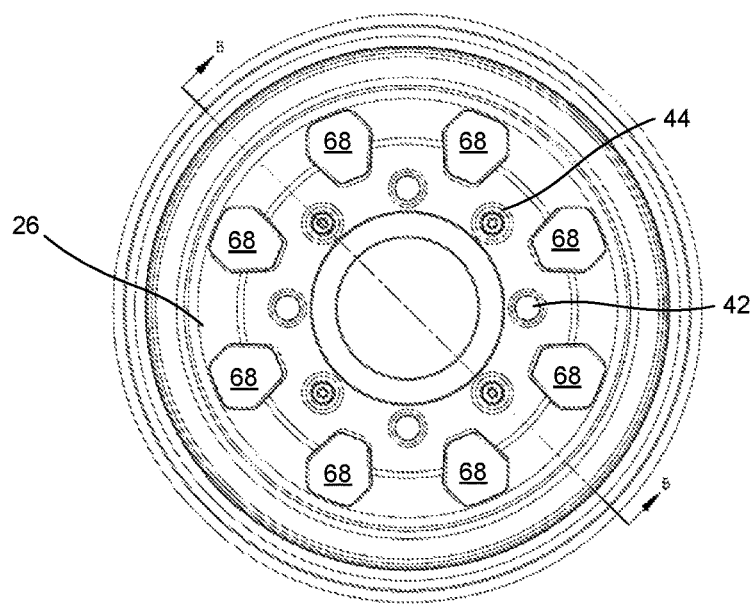
FIG. 15 is a side elevation of a hybrid wheel, including a rim flange insert cap ring, wheel center face insert, rim, and center disc, indicating line B-B, according to various embodiments of present disclosure.
Figure 16:
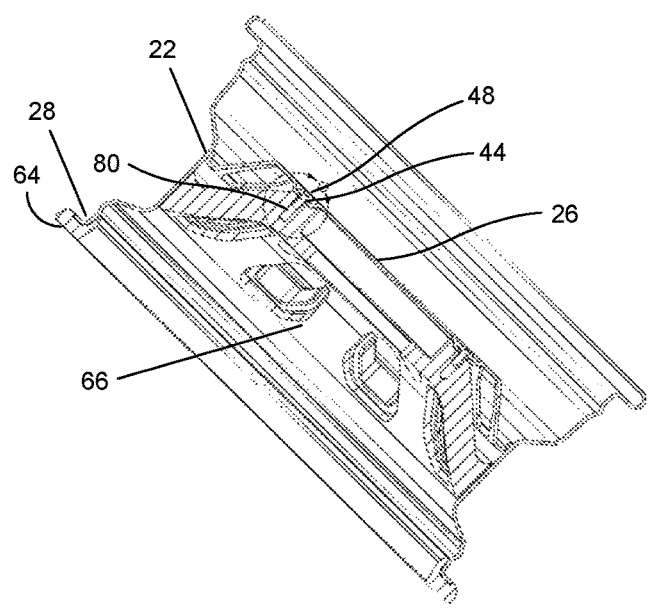
FIG. 16 is a partial longitudinal sectional view of a hybrid wheel, including a rim flange insert cap ring, wheel center face insert, rim, and center disc, taken along line B-B, according to various embodiments of present disclosure.
Figure 17:
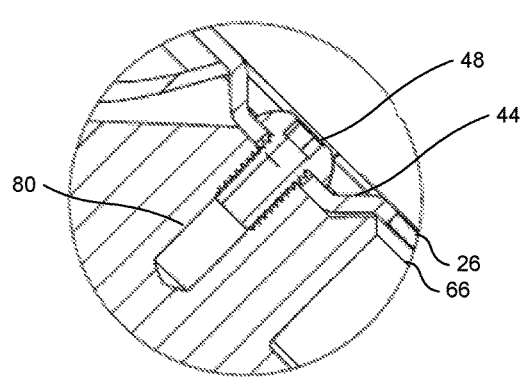
FIG. 17 is a detailed view of an optional screw to secure a center disc to a wheel center face insert according to various embodiments of present disclosure.
Figure 18:
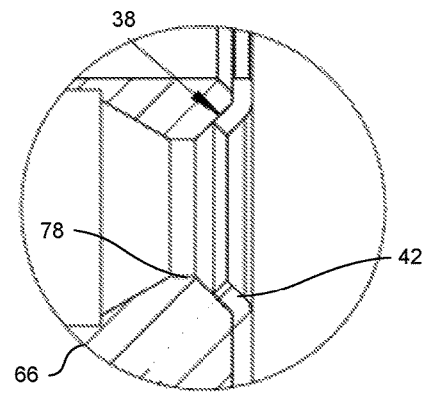
FIG. 18 is a detailed view of an anti-rotational feature such as a chamfer or extrusion, to constrain against rotation a center disc and a wheel face insert via backside of bolt holes, at the bolt apertures of the wheel center face insert and center disc, according to various embodiments of present disclosure.
Figure 19:
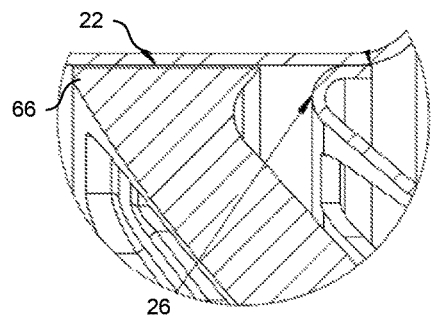
FIG. 19 is a detailed view of a wheel center face insert and a center disc meeting the inner surface of a rim, according to various embodiments of present disclosure.
Figure 20:
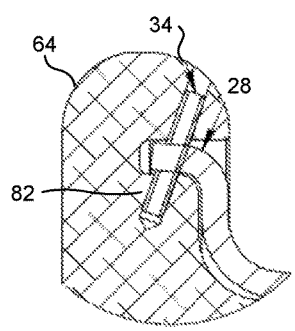
FIG. 20 is a detailed example of a rim flange insert cap at rim fitment secured with optional pins, according to various embodiments of present disclosure.
Figure 21:
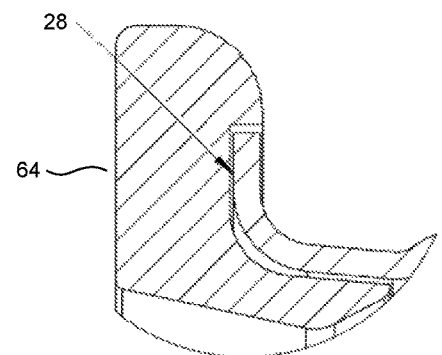
FIG. 21 is a detailed example of a rim flange insert cap at rim fitment, according to various embodiments of present disclosure.

FIGS. 12*a* and 12*b* illustrate an example of a hybrid wheel in partially exploded views depicting a rim flange insert cap ring 64, a wheel center face insert 66, functional rim 22, and a center disc 26, each having a front and rear side according to various embodiments. In some embodiments, the wheel face insert 24 optionally comprises two or more pieces, for example a rim flange insert cap ring 64 and wheel center face insert 66. A center axis X-X is denoted for reference. According to various embodiments, assembly of the hybrid wheel can be secured by using pins, screws, rivets, welds, and/or structural adhesive.

The wheel center face insert 66 can include a decorative pattern. For example wheel center face insert 66 can include a plurality of cut-out geometric patterns 68 radially disposed around the center hub 76. One skilled in the art will recognize that the decorative pattern can take the form of any number of decorative patterns. For example while the wheel center face insert 66 depicted in the figures includes eight cut-out geometric patterns 68, the actual number of cut-outs can be more or less than eight. Additionally, while the figures illustrate the multiple of the same geometric pattern cut-out 68, there may be alternating shapes, more than one repeated pattern, or other decorative configurations. Other patterns include, but are not limited to, geometric patterns and solid discs with patterns embossed; cut-out, or extruded, including logos and special shapes.

The wheel center face insert 66 can have a first surface 70 and second surface 72, designed to rotate about a center axis X-X. The first surface 70 can be considered the front surface and the second surface 72 can be considered the rear surface. A plurality of bolt apertures 78 can be located around wheel center face insert center hub 76. In various aspects, apertures 78 can be radially disposed about axis X-X, preferably though not necessarily all being equally radially disposed. In some aspects, the bolt apertures 78 may be evenly spaced. In some embodiments, the rear side or second surface 72 of the wheel center face insert 66 can have a greater thickness and is sectioned at each bolt aperture 78. In some aspects, each rear side bolt aperture 78 can have a beveled or chamfered edge 38. Optionally, interspersed between the rear side bolt apertures 78 are screw seats 80. In some aspects, the optional screw seats 80 may alternate with the bolt apertures 78. The wheel face center insert 66 can be made of aluminum, aluminum alloy, magnesium, composite, carbon fiber, plastic, or some other material, for example a material with the appearance of aluminum on the first surface.

The rim flange insert cap ring 64 can have a flange, which can optionally contain pin seats 82 spaced about the periphery on the rear side thereof. The rim flange insert cap ring 64 can be made of aluminum, aluminum alloy, magnesium, composite, carbon fiber, plastic, or some other material, for example a material with the appearance of aluminum on the first surface. The rim flange insert cap ring 64 is secured to the functional rim 22. In some embodiments, structural adhesive is used at the first annular edge 28 to secure the rim flange insert cap ring 64 to secure to the functional rim 22. By a structural adhesive is meant typically epoxy, urethane or acrylic materials with a lap shear strength of greater than 2 MPa. Suitable structural adhesives include Dow BETA-MATE™, Ashland Chemical Pliogrip™, 3M Scotch-Weld™, LORD Maxlok™, and similar products.

As previously described, the functional rim 22 is substantially cylindrical having a first annular edge or bead rim 28 at the front and a second, opposed annular edge or bead rim 30 at the rear with a specified depth measured along the center axis. In some aspects, the functional rim 22 has a plurality of annular sections that vary in width at specified radii from the center axis X-X. In various embodiments, the functional rim 22 can be made from steel, composite, or other material of similar strength properties. In one embodiment, the functional rim 22 is preferably made from high strength low alloy steel with a 45 ksi min yield in 2 mm or thinner. The high strength low alloy steel can range from 35-86 ksi and any range in between, preferably 35-55 ksi min yield. In another embodiment, the functional rim 22 can be made from super high strength steel with 80 ksi min yield. The material thickness for a functional rim 22 can range from 1 mm to 6 mm, 1 mm to 5 mm, 1 mm to 4 mm, 1 mm to 3 mm, or 2 mm or thinner.

As previously described, the center disc 26 can have an annular lip 60 with a center aperture 62. Radially disposed around the center aperture 62 can be a plurality of bolt apertures 42 designed to locate and secure in position against bolt apertures 78 in wheel face insert 24. In one or more aspects the bolt apertures 42 can be chamfered. In some embodiments, screw apertures 44 are interposed with the center disc bolt apertures 42. In some embodiments, the center disc bolt apertures 42 and screw apertures 44 alternate. The center disc 26 can be made from steel, composite, or other material of similar strength properties. In an embodiment, the center disc 26 is preferably made from high strength low alloy steel with a 45 ksi min yield in 2 mm or thinner. The material thickness for the center disc 26 can range from 1 mm to 6 mm and any range in between. In various embodiments, the functional rim 22 and the center disc 26 are made from the same material, such as a high strength steel. In other embodiments, the center disc 26 is made of a different material than the functional rim 22.

Turning to FIGS. 13-21, according to various embodiments, the wheel center face insert 66 is attached or secured to the center disc 26 and/or the functional rim 22. The wheel center face insert 66 can be attached or secured to the functional rim 22 at the wheel center face insert outside edge 74 pressed into the inner surface 32 of the functional rim 22 at a given set back depth.

According to some embodiments, the wheel center face insert 66 is secured by structural adhesive to the functional rim 22 or to the center disc 26 or both, as illustrated for example in FIGS. 17-21. According to various embodiments, the wheel center face insert 66 is locked or secured to the center disc 26 at their respective screw or bolt apertures 78, 42 (see, for example, FIG. 17), optionally using structural adhesive to secure. In some embodiments, a chamfered connection 38 facilitates the alignment of the bolt apertures as illustrated for example in FIG. 18. According to some embodiments, the wheel center face insert 66 is secured to the functional rim 22 using structural adhesive around the circumference at the outside edge 74, as shown for example in FIG. 19. According to various embodiments, the wheel center face insert 66 is locked or secured to the center disc 26 at their respective screw apertures 44, 80 or bolt apertures 42, 78 (see, for example, FIG. 17).

Assembly of the hybrid wheel 20 can be secured by using pins, screws, rivets, welds, and/or structural adhesive. In a non-limiting example, the wheel center face insert 66 can be attached to the center disc 26 by means of structural adhesive, such as a liquid structural adhesive, a membrane, or transfer tape. Additionally, the wheel center face insert 66 can be secured to the center disc 26 by locking a plurality of wheel face bolt apertures 78 to a plurality of center disc bolt apertures 42. In some embodiments, a plurality of pins 34 in multiple places around the periphery of the functional rim 22 marked by predetermined pin seats 36 secure the rim flange insert cap 64 to the functional rim 22 (see, for example, FIG. 20). In other embodiments, the rim flange insert cap 64 can be secured to the functional rim 22 at the first annular edge 28 by structural adhesive (see, for example, FIG. 21).

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

PARTS LIST 20 hybrid wheel
22 functional rim
24 wheel face insert
26 center disc
28 first annular edge
30 second annular edge
32 inner surface
34 pins
36 wheel face pin seat
38 chamfered connection
40 wheel face bolt aperture
42 center disc bolt aperture
44 center disc screw aperture
46 wheel face screw seat
48 screw
50 wheel face insert annular rim
52 wheel face insert center hub
54 spoke
56 first surface wheel face insert
58 second surface wheel face insert
60 center disc annular lip
62 center disc center aperture
64 rim flange insert cap ring
66 wheel center face insert
68 geometric pattern cut-out
70 first surface wheel center face insert
72 second surface wheel center face insert
74 wheel center face insert outside edge
76 wheel center face insert center hub
78 wheel center face insert bolt aperture
80 wheel center face insert screw seat
82 rim flange insert cap ring pin seat Therefore, the following is claimed:

1. A hybrid wheel comprising a functional wheel rim, a center disc, and a wheel face insert, the functional wheel rim having a first bead rim and an opposed second bead rim, and an annular opening through the center thereof along an axial direction, the annular opening having an inner annular surface, the center disc configured to be positioned within the annular opening of the functional wheel rim and having an outer annular edge configured to be secured to the inner annular surface of the functional wheel rim, the wheel face insert configured to be secured directly to the center disc to form the hybrid wheel, wherein the wheel rim and the center disc are made of a specified material, and wherein the wheel face insert is made of a dissimilar material.

2. The hybrid wheel of claim 1, wherein the specified material is steel.

3. The hybrid wheel of claim 2, wherein the wheel face insert is made of at least one of aluminum alloy, magnesium, carbon composite, or plastic.

4. The hybrid wheel of claim 3, wherein the wheel face insert is secured to the center disc by at least one of screws, pins, rivets, or structural adhesive.

5. The hybrid wheel of claim 3, the wheel face insert is secured to the functional rim by at least one of screws, pins, rivets, or structural adhesive.

6. The hybrid wheel of claim 1, wherein the specified material is high strength low alloy (HSLA) steel having a 45 ksi min yield in 2 mm or thinner.

7. The hybrid wheel of claim 1, wherein the specified material is a composite material.

8. The hybrid wheel of claim 1, wherein the wheel face insert is made of at least one of aluminum alloy, magnesium, carbon composite, or plastic.

9. The hybrid wheel of claim 1, wherein the wheel face insert is locked in place to the center disc with chamfered bolt apertures.

10. The hybrid wheel of claim 1, wherein the wheel face insert is secured to the center disc by at least one of screws, pins, rivets, or structural adhesive.

11. The hybrid wheel of claim 10, the wheel face insert is secured to the functional rim by at least one of screws, pins, rivets, or structural adhesive.

12. The hybrid wheel of claim 1, the wheel face insert is secured to the functional rim by at least one of screws, pins, rivets, or structural adhesive.

13. The hybrid wheel of claim 1, wherein the wheel face insert comprises a wheel center face insert and a rim flange cap ring about a peripheral edge of the wheel center face insert, the rim flange cap ring being secured to the first bead rim of the functional wheel rim.

14. The hybrid wheel of claim 1, wherein the wheel is configured for use on an ATV, an RTV, or a UTV.

15. The hybrid wheel of claim 1, wherein the wheel is configured for use on a light truck.

16. The hybrid wheel of claim 1, wherein the wheel is configured for use on a trailer.

17. The hybrid wheel of claim 1, wherein the wheel face insert is made of a material having a lower strength than the specified material of the functional wheel rim.

18. The hybrid wheel of claim 1, wherein the wheel face insert is secured directly to the center disc to constrain the wheel face insert against rotation relative to the functional wheel rim.

* * * * *